Dec. 16, 1969 R. L. PERKINS ET AL 3,484,760

DISC FILE AND ACTUATOR THEREFOR

Filed June 9, 1966 3 Sheets-Sheet 1

INVENTORS

Robert L. Perkins

Lloyd M. Thorndyke

Daniel C. Sullivan

BY Joseph A. Genovese

ATTORNEY

DISC FILE AND ACTUATOR THEREFOR

INVENTORS

Robert L. Perkins
Lloyd M. Thorndyke
Daniel C. Sullivan

BY Joseph A. Genovese
ATTORNEY

DISC FILE AND ACTUATOR THEREFOR

INVENTORS
Robert L. Perkins
Lloyd M. Thorndyke
Daniel C. Sullivan
BY Joseph A. Genovese
ATTORNEY United States Patent Office 3,484,760

Patented Dec. 16, 1969

3,484,760

DISC FILE AND ACTUATOR THEREFOR

Robert L. Perkins, St. Paul, Lloyd M. Thorndyke, Elina, and Daniel C. Sullivan, Columbia Heights, Minn., assignors to Control Data Corporation, Rockville, Md.

Filed June 9, 1966, Ser. No. 556,487
Int. Cl. G11b 5/00
U.S. Cl. 340—174.1 9 Claims

ABSTRACT OF THE DISCLOSURE

Apparatus to rapidly position sets of magnetic heads to precise, ordered positions with respect to data storage discs of a disc file, wherein the apparatus has two assemblies of linear actuators, carriages and sets of heads movable through equal distances in opposite directions. The axes of the linear actuators are parallel to a common axis which passes through the centers of gravity of the carriages, and the connections of the actuators to the carriages are geometrically arranged such that the resultant reactions to the driving forces of the actuators are equal and opposite. The vector sum of these reactions is zero whereby the frame of the disc file is undisturbed by the driving forces and their reactions. As a consequence, unwanted mechanical and acoustic shock, vibration, flexure, etc. which ultimately reflect in increased access time and reduced accuracy of the disc file, are eliminated at their inceptions.

This invention relates to data storage and retrieval systems and particularly to such systems which have means for positioning one or more transducers to ordered positions with respect to one or more records in which the data is stored or is being recorded.

One aspect of the invention is concerned with positioning apparatus (also called an actuator herein) to obtain rapid and exact positioning of transducers. In this connection, the invention is described in terms of a random access disc file with magnetic transducers. However, the disc file application is given by way of example only. Other forms of magnetic or electrostatic data storage devices can advantageously use features of the invention. Also, the nature of stored data is not critical. For example, the data can be optical, in which case the transducer will be photosensitive and will be arranged for either light transmissive or reflective sensing of the data. Further, it is understood that positioning a transducer relative to a record can be accomplished by having our positioning apparatus move the transducer with respect to the record or by having the apparatus move the record with respect to the transducer. Also, both the transducer and the record can be made movable by separate positioning devices.

Magnetic disc files are so well known to the computer industry that a complete description of a typical file is unnecessary. However, it is worth mentioning that there are continuing efforts to reduce access time, to increase the accuracy in positioning the transducer to preselected tracks (positions) on the discs, and to increase the storage capacity of disc files. This invention has resulted from such efforts and has as one of its objects, to provide means for obtaining more rapid and exact positioning of transducers relative to one or more discs of a disc file.

More specifically, in positioning transducers rapidly to selected tracks of a disc, controlled and predesigned accelerations, both negative and positive, are used. The transducer supporting and driving mechanisms have appreciable mass. Thus in stopping and starting, currently available disc file transducer positioning apparatus is plagued with shock, bending, vibration, mechanical resonance, flexure and other mechanical and acoustic limitations and problems. These directly increase the access time of a disc file and often produce appreciable oscillations and vibrations of the heads over the data tracks. In the prior art, measures have been taken to cope with these problems, for example U.S. Patent No. 2,994,856 discloses a system for damping the positioning mechanism under a program which varies in response to several variables such as mass and length of travel of the transducer support. This is not to say that our invention must not use damping or other known techniques. This is to say that the above patent disclosure is typical of the art in the sense that the unwanted difficulties such as vibrations are postulated, and steps are taken to cope with them, e.g. damping vibrations in the case of the noted patent.

Our invention represents a departure from the philosophy implicit in the above. Instead of assuming the existence of shock, vibration, etc. to be inviolate, we take steps to prevent them at their inception or prevent them from ever reaching serious levels. This is accomplished by our transducer positioning apparatus in which there is a mechanical arrangement of linear actuators, carriages and synchronizing devices by which the reactive forces originating from motions of the positioning apparatus are balanced as explained below.

In moving a set of transducers from one position to another in prior designs, the reactions to the driving forces are ordinarily opposed by a fixed structure. These reactions constitute a significant percentage of the origin of many of the mechanical and acoustic limitations mentioned before. According to our invention, we provide means to counteract these reactions by dynamically producing other forces equal and opposite to the first-mentioned reactions. An attractive means to accomplish this is a second substantially identical set of transducers, a carriage and linear actuators so arranged that as the first set of transducers is moved, the second set is moved the same distance but in the opposite direction. Another way to accomplish the same result is to use a weight in place of the second carriage and their transducers, but this will not provide the later described advantage of concurrently using more than one stack of discs.

In one form of our invention, we utilize a base structure, e.g. a pedestal, and two carriages to which respective sets of transducer arms are secured. The carriages are constrained to movement along a common axis. First and second pairs of linear actuators, e.g. solenoids (not shown) or liquid or pneumatic cylinders, are fixed to the base. The first pair is also attached to the first carriage and the second pair to the other carriage. The axes of the linear actuators are parallel to the common axis, and the connections to the carriages are geometrically arranged such that the resultant reactions to the driving forces of the two sets of linear actuators are equal and opposite to each other and act along a common axis. The vector sum of these reactions is zero. Therefore, the base structure is undisturbed by the driving forces and/or their reactions.

The above described arrangement of linear actuators is illustrated but is not the only possible arrangement. We have also used linear actuators for the carriages which are coaxial and on the common axis of movement of the carriages. However, we have selected for illustration only, two actuators for one carriage with the two offset, one above and one below the horizontal plane of the common axis. This axis passes through the centers of mass of the carriages and everything supported by them. The remaining two linear actuators (for the other carriage) are similarly attached, i.e. they are arranged one above and one below the common axis. As a result of this common axis arrangement, if there are any unbalanced reactive forces which may be applied to the base, the forces will be small. As explained below, with our arrangement, it is easy to eliminate even small reactive forces.

In our system we have duplicate sets of linear actuators (e.g. cylinders), carriages and everything supported by the carriages. The geometry is such that when one carriage is moved by its set of linear actuators, the other is moved by its set of actuators through an equal distance in the opposite direction. With the common axis and centers of gravity relationship mentioned before, one carriage and everything supported by it constitutes a dynamic means to react against the other thereby balancing the entire system so that the base structure theoretically experiences no reactive force.

In mechanical motions, ideal conditions are not easily obtained although they can be closely approached. In our case, for example, one of the cylinders may not have the exact diameter of the other or the frictions may differ. In such instances the base structure may experience a reactive force, however small. But even this can be eliminated easily owing to our design which entails the dynamic means mentioned above. We can, for example, adjust the mass of the appropriate carriage assembly. Mass adjustment can be the adding or subtracting of weight from the linearly movable carriage assembly somewhat suggestive of balancing a rotary flywheel or shaft.

Accordingly, an important distinction of our system with respect to prior actuator systems, is that it exhibits the possibility of adjustment, by simple means, to the degree of perfect balance desired by the manufacturer. Any system which does not use a dynamic reactive means as we do, does not exhibit a similarly simple way to eliminate reactive forces experienced by its base structure. To our knowledge prior positioning devices attack the problem in an entirely different way, i.e. by strengthening the base structure in an effort to make it inflexible.

To assure exactness in motion of the two carriages of our positioning apparatus, we have mechanical synchronizers connecting the carriages. In a manner similar to the dynamic balancing mentioned above, any transfer forces between the synchronizer-carriage assemblies will have only a small reaction in the base. It has been found in operation that the reactive forces in our base structure are so small that the base plate or pedestal mounting plate experiences no measurable reactive forces. In prior disc files reactive forces transmitted to the main frame cause many obvious and some obscure difficulties which ultimately reflect in increases of access time due to head settling time.

As mentioned before, there is an advantage in using two sets of transducers and two carriages arranged so that the reactive forces in moving one are equal and opposite to those resulting from moving the other. A weight could be used in place of one carriage and one set of transducers. However, in using two sets of transducers, two stacks or sets of discs can be serviced (read or recorded) concurrently in a disc file with equal exactness and rapidly. The recording methods and formats used for storing data in the sets of discs forms no part of our invention, except as our positioner with its multi-stack servicing capacity allows the programmer to so arrange the data that the effective useful storage capacity of the file is increased.

Accordingly, another object of the invention is to provide a disc file with more than one stack or set of discs together with a single positioning apparatus having an individual set of transducers for each stack of discs.

Another object of the invention is to provide such a disc file and positioning apparatus wherein sets of transducers and their carriages are moved through identical distances but in opposite directions with the arrangement being such that the reactive forces are equal and opposite. In other words, one carriage functions as a dynamic means to balance the other.

Another object of the invention is to provide a disc file generally as above but which can be constructed in a wide variety of sizes and configurations for adaptation to numerous classes of large and small equipment.

A further object is to provide a basic positioner or actuator apparatus capable of being used with one or a plurality of stacks of discs in a number of ways. For example, three, four or more stacks can be used and either the stacks or the actuator can be indexed to associate the sets of transducers with selected stacks of discs.

Other objects and features will become evident as the description of the illustrated forms of the invention proceed.

Figure 2:
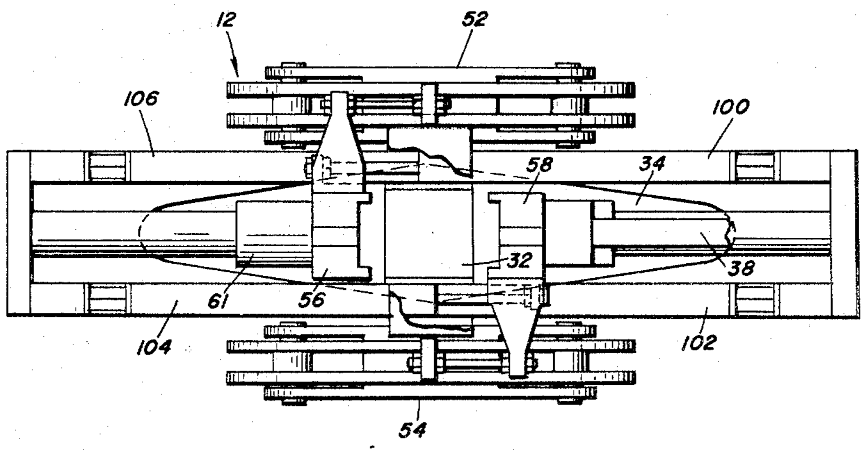
FIGURE 2 is a fragmentary top view of our positioning apparatus with certain parts omitted or broken away to show otherwise hidden details.
Figure 1:
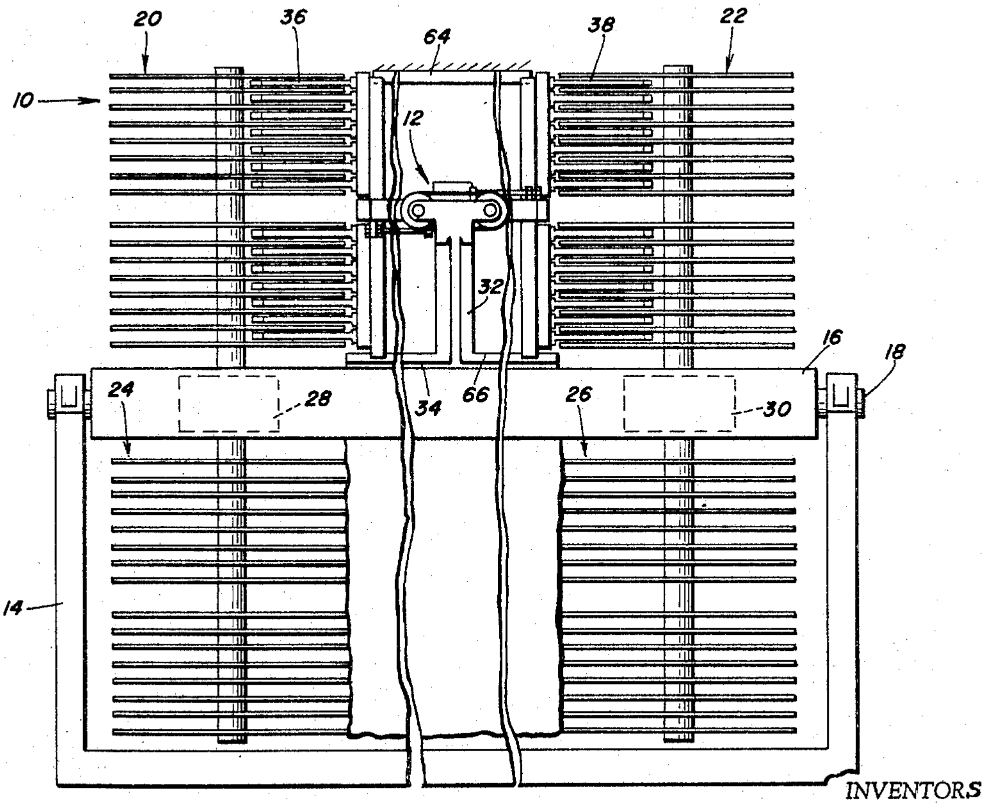
FIGURE 1 is a fragmentary diagrammatic side view of a disc file utilizing the principles of the invention.

FIGURE 1 schematically shows disc file 10 using our positioning apparatus or actuator 12 which is also schematically represented. Disc file 10 has a main frame 14 to which sub-frame 16 is attached by pivotal mounts 18 so that the sub-frame can be rotated 180° about a horizontal axis and locked in place for service or other purposes. The pivot arrangement is optional. The illustrated disc file has four sets or stacks 20, 22, 24 and 26 of discs and only one pair of stacks is generally used at a time. However, it is obvious that one, two, or three or all four of the stacks of discs can be used concurrently.

As is customary, the surfaces of the disc are coated or plated or the discs themselves are made of material suitable for magnetic storage of data. The stacks of discs are rotated conventionally and to illustrate this, motors 28 and 30 are shown with through shafts to which disc-supporting spindles for the four stacks of discs are attached.

Positioner 12 will be described in detail subsequently. However, its relationship to the discs of the disc file is mentioned now. As shown in FIGURE 1, positioner 12 has a base or base structure 32 in the form of a pedestal with a base or mounting plate 34 fixed to sub-frame 16 between disc stacks 20 and 22. There is an identical actuator mounted between stacks 24 and 26, however, it is obscured in FIGURE 1 by a cover. Positioner 12 has two carriages constrained to move concurrently in opposite directions. Each carriage has a set of transducer supporting arms. The set 36 of arms shown to the left of the actuator in FIGURE 1 are used with the discs of stack 20 to record and read in any accepted manner, while the set 38 of transducer supporting arms are operative with the various tracks of the discs in stack 22.

Figure 6:
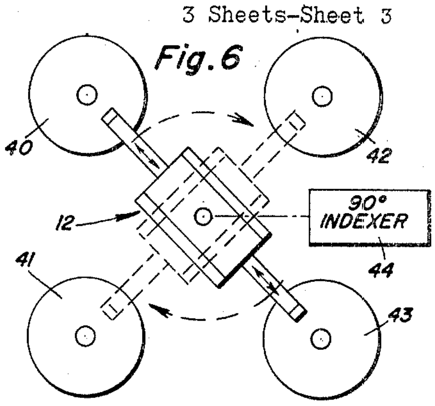
FIGURE 6 is a diagrammatic plan view showing a modification of a disc file using the actuator of the invention.

While it is considered that the disc file configuration of FIGURE 1, i.e. four stacks of discs and two actuators, or one-half of it (two stacks of discs and a single actuator) is an efficient configuration, computer system requirements or other requirements may suggest that other configurations are equally or, in given instances, more efficient. For example, two actuators can be used with a single stack of discs, or a single actuator can be used in connection with any practical number of stacks of discs. In FIGURE 6 there are four stacks 40, 41, 42 and 43 of discs with a positioner 12 so located that the two sets of transducer-supporting arms are operative with stacks 40 and 43. As shown in dotted lines, positioner 12 can be indexed 90° so that the two sets of transducers on their arms will then be used with the stacks 41 and 42 of discs. The positioner 12 of FIGURE 6 can be mounted on a vertical spindle and manually turned to the selected position. Alternatively a conventional 90° indexer 44 can be used for this purpose.

Figure 7:
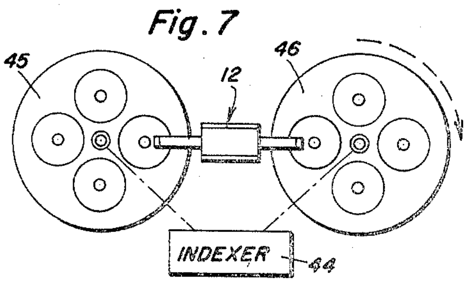
FIGURE 7 is a diagrammatic plan view showing another modification.
Figure 5:
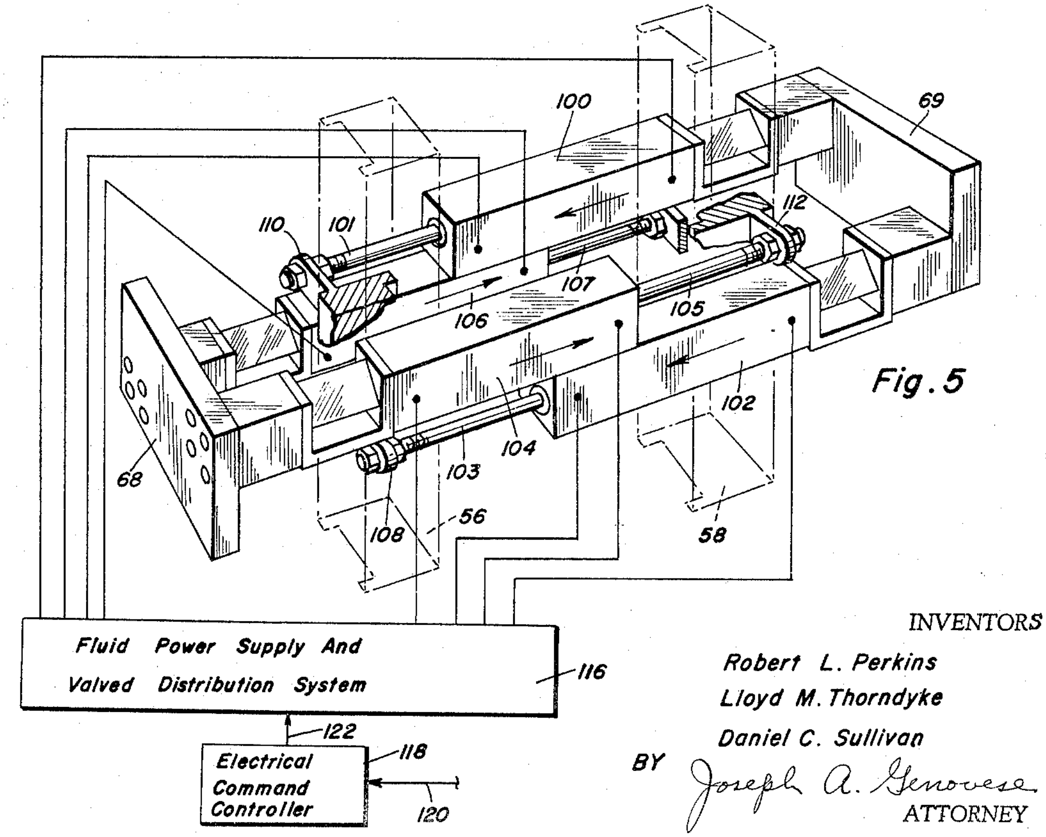
FIGURE 5 is a diagrammatic perspective view showing the arrangement of linear actuators together with the fluid power supply and valve distribution system for the linear actuators, and an electrical command responsive controller for the valved distribution system.

FIGURE 7 is another illustration of extended use of a single positioner. Positioner 12 is located between two carousels 45 and 46, each containing four vertical stacks of discs although this number can be increased or decreased. The carousels can be manually positioned by rotation, or either or both carousels can be indexed by a conventional indexer 44. Accordingly, with the actuator 12 stationary, the selected stack of discs of either or both carousel can be moved into operative relationship with the transducers schematically shown at the ends of two sets of arms of positioner 12. Summarizing, relative motion between the positioner and the stacks of discs can operatively relate the transducers to select the desired stacks, and it is immaterial whether the relative motion is obtained by moving the positioner or by moving the stacks of discs.

Attention is directed to the details of the positioning apparatus shown in FIGURES 2–5. Base structure 32 of the positioning apparatus serves as a pedestal. The shape of base structure 32 (FIGURES 3 and 4) is not important so long as it serves its purpose. For instance, the base can have a central section (FIGURE 3) and a pair of side sections 50 and 51 each including a pair of parallel plates to support identical synchronizers 52 and 54 whose construction and function is described later. In assembly of the disc file, the mounting plate 34 is bolted or otherwise secured to the main frame of the disc file or to another portion thereof, for example, sub-frame 16 (FIGURE 1).

The positioning apparatus has two carriages, identified as first carriage 56 and second carriage 58. The sets of transducer supporting arms 36 and 38 are attached to the main vertical support members of the carriages for movement therewith. The motion of each carriage is constrained to rectilinear movement by upper and lower guides 60 and 62, and by an intermediate guide 61 operatively connected with the main vertical support member of the carriages. The upper and lower guides are shown as pairs of rollers engaging parallel rails 64 and 66 attached to the base structure of the positioner, however, other types of conventional guides can be substituted. The same applies to the two intermediate guides 61 for the two carriages 56 and 58. The intermediate guides are illustrated as stationary horizontal shafts 67 fixed to the central portion of the base structure 32 and to a pair of end plates 68 and 69, together with sleeve bearings 70 on the carriages, which slide on the shafts 67.

Synchronizers 52 and 54 are identical. The synchronizer 54 consists of two pairs 72 and 74 of idler wheels mounted for rotation on spindles 75 and 76 suitably journaled in bearings in the side section 51 of base structure 32. A pair of bands 78 and 79 is mounted on corresponding pairs of the idler wheels.

Figure 3:
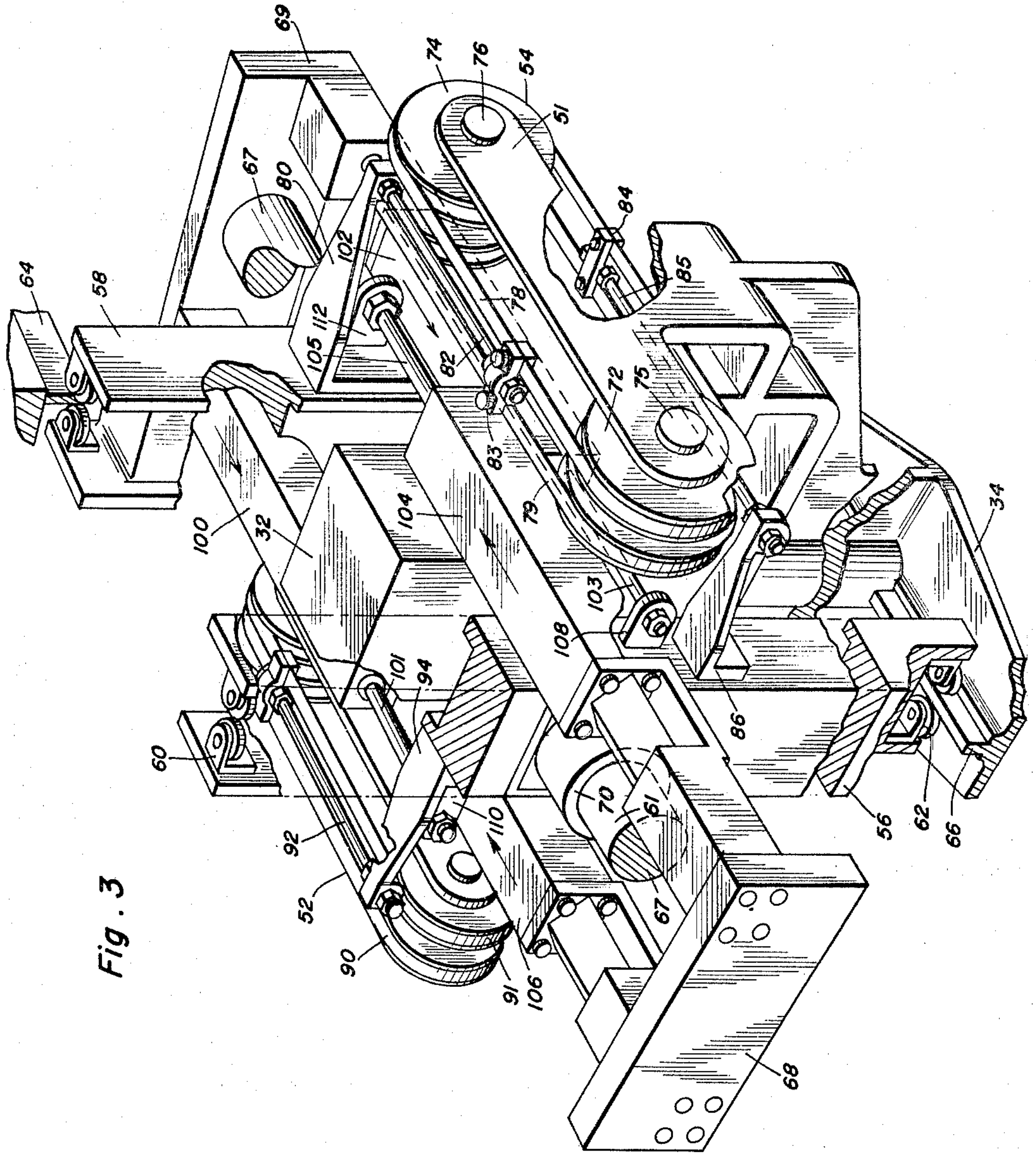
FIGURE 3 is a fragmentary perspective view of the positioning apparatus.

The main support member of carriage 58 has a bracket 80 attached to it, and motion-transfer rod 82 is adjustably fixed to the pair of bands 78 and 79 and to the bracket 80. As illustrated in FIGURE 3, clamp 83 attaches rod 82 to the upper flights of bands 78 and 79. Clamp 84 is used to attach rod 85 to the lower flights of the same bands, this rod being suitably secured to a bracket 86 functioning in a manner similar to bracket 80. However, bracket 86 is secured to the main upright support member of carriage 56 so that the synchronizer at 54 assures that motions of the two carriages are precisely concurrent and through identical distances. The role played by synchronizer 54 and synchronizer 52 as far as transfer forces is concerned is important and is described later. As indicated before, synchronizer 52 is the same as synchronizer 54 except that it is attached to the opposite side of the positioning apparatus. Accordingly, synchronizer 52 is made of a pair of bands 90 and 91 mounted on idler wheels the same as idler wheels 72 and 74. The upper flights of bands 90 and 91 have rod 92 attached thereto by means of a clamp, and this rod is attached to the carriage 56 by means of bracket 94. The lower flights of bands 90 and 91 (FIGURE 4) have rod 96 clamped thereto (or otherwise fastened), and this rod is secured to bracket 98 which is fastened, fixed or made integral with the main support member of carriage 58.

Carriages 56 and 58 have identical means for actuating them. Although other means such as electrical can be used, we prefer a pair of linear actuators such as pneumatic or hydraulic cylinders for each carriage. For the carriage 56 (FIGURE 5) the pair of cylinders 100 and 102 is used. For the carriage 58, cylinders 104 and 106 are used. All of the cylinders are attached to the base structure either directly or indirectly. Stiffening and aligning structures including end plates 68 and 69 are secured to the outer ends of the respective pair of cylinders. The previously mentioned shafts 67 constituting parts of guides 61 are secured to the end plates 68 and 69.

Piston rods 101 and 103 of cylinders 100 and 102 are secured to carriage 56 by being fixed to brackets 108 and 110 integral with or otherwise fixed with main support member of the carriage. In like manner piston rods 105 and 107 of cylinders 104 and 106 are fixed to the main support member of carriage 58 by being fastened to its brackets 112 and 114.

The fluid power supply and valved distribution system 116 schematically represents any suitable means for actuating the hydraulic cylinders in unison. The valved distribution system is under the control of an electrical command controller 118 adapted to receive input signals via cable 120 and to transmit them over cable 122 to the valved distribution system. From this schematically represented system 116 we have illustrated a network of hydraulic conduits to represent means for conducting fluid under pressure to and from the hydraulic cylinders in a manner suitable to cause the hydraulic linear actuators to operate in unison and with equal force. It is understood that as far as our present invention is concerned, known hydraulic valving and distribution techniques are used. The same applies to the input signal responsive controller 118 which is assumed to be conventional and in practice, would generally be under control of a computer system.

Figure 4:
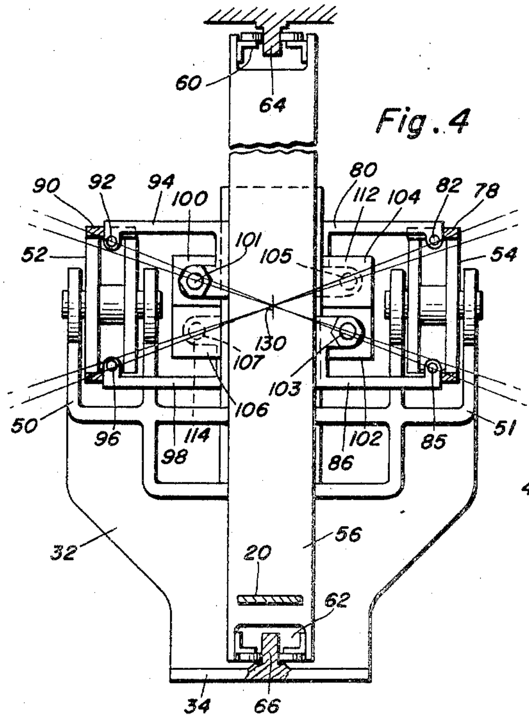
FIGURE 4 is an end sectional view of the positioning apparatus, there being parts omitted in order to illustrate geometrical relationships which would otherwise be obscure.

Attention is now directed to FIGURE 4. Horizontal centerline 130 is on an axis common to the rectilinear motions of the two carriages, and the common axis passes through the center of mass of each carriage and everything supported by it. The axes of the four cylinders 100, 102, 104 and 106 are parallel to common axis 130. The points of application of force from cylinders 100 and 102 to the carriage 56 are offset as shown in FIGURE 4, that is, one is above and one is below and one is on each side of common axis 130. Similarly, the points of application of force from cylinders 104 and 106 to carriage 58 are offset with respect to common axis 130. It is thus evident that both carriages are actuated simultaneously through similar distances in opposite directions. The resultants of the pushing (or retracting) pairs of cylinders intersect at the center of mass of the carriages. With the common axis passing through the centers of mass of both carriages and the carriages of equal mass, one carriage provides a dynamic reaction for the other. In an imperfect system, any reactive forces due to force unbalance experienced by the base structure 32 will be small. Even these can be reduced to zero or near-zero by adjusting the mass of the pertinent carriage (adding or subtracting weight) appropriately so as to maintain the centers of mass in proper relationship.

The cylinders 100, 102, 104 and 106 cannot be made to be identical, and the purpose of the synchronizers 52 and 54 is to prevent any tendency of one carriage and its piston rods from being moved at a rate greater than the other. More specifically, if one piston rod attempts to accelerate or decelerate at a rate different from the others, its force difference is applied through the bands and carriage to the other three piston rods. The pertinent dotted lines in FIGURE 4 show that transfer forces from one carriage to the other, if any, have reactions through the common axis 130 for the same reason as described in connection with the hydraulic actuators.

It is noted that the synchronizers may be omitted or they may assume other forms. These and numerous other variations falling within the scope of the following claims may be resorted to. For example, we mentioned that we have used concentric cylinders instead of the illustrated offset cylinders. The concentric cylinder arrangement provides at least a cost-reduction benefit. In the concentric cylinder arrangement, the cylinders (FIGURE 3) 104 and 106 are replaced by a single cylinder at the illustrated location of guide 61, and the cylinders 100 and 102 are replaced by another single cylinder at the illustrated location of guide 67. The single cylinders (not shown) will act as guides just as the shafts serve as guides 61 and 67. It is, of course, understood that the concentric cylinders are attached to base 32 and to the carriages 56 and 58.

What is claimed is:

1. In a magnetic disc file, the combination of a first set of spaced discs and a second set of spaced discs spaced from the first set, means for rotating said discs, a first and a second set of transducers for the respective sets of discs, a frame, a first and a second carriage mounted for movement relative to said frame, said sets of transducers attached to said carriages for movement therewith, actuators attached to said carriages, and means between said actuators to require said carriages to move in opposite linear directions in a manner such that the movement of one carriage provides a dynamic reaction for the other and said frame experiences no substantial reactive load.

2. The magnetic disc file of claim 1 and a fluid pressure system including a valve and a fluid conductor network connected to said actuators, means responsive to electrical command signals to control said valve and thereby cause said actuators to operate, and means for synchronizing the movements of said carriages.

3. The disc file of claim 1 and a third set of discs, and means to provide relative movement between said frame together with its carriages and said sets of discs to relocate said first set of transducers from said first sets of discs to said third set of discs.

4. A balanced reaction positioner apparatus for obtaining a selected relative position between a transducing means and a record means, said apparatus comprising the combination of movable means for supporting said transducing means for movement along a common axis, a frame, means connected to said frame for actuating said supporting means to position the same said means along said axis, movable mechanical means movable along said common axis and cooperating with said actuating means for producing a reactive force equal and opposite to the reactive force necessitated by the actuation of said supporting means such that disturbance to the frame is thereby eliminated, said movable mechanical means including a second supporting means operated by said actuating means concurrently with said first-mentioned supporting means but in the opposite direction, both of said supporting means having substantially equal weight and centers of gravity intersected by said common axis and each supporting means having a carriage, said transducing means including a transducer on each carriage, means to constrain the movement of said carriage to linear motion along said axis, and said record means including data storage records with which said transducers are operable for positioning upon movement of said mechanical means.

5. The subject matter of claim 4 and means connected to said carriages for synchronizing the motions of said carriages.

6. A balanced reaction positioner apparatus for obtaining a selected relative position between a transducing means and a record, said apparatus comprising the combination of movable means for supporting said transducing means for movement along a common axis, a frame, means connected to said frame for actuating said supporting means to position the same said means along said axis and thereby position said transducing means relative to said record, movable mechanical means movable along said common axis and cooperating with said actuating means for producing a reactive force equal and opposite to the reactive force necessitated by the actuation of said supporting means such that disturbance to the frame is thereby eliminated, said mechanical means including a second transducing means and a second supporting means therefor whereby said second transducing means are positionable relative to a second record at the same time that said first-mentioned transducing means are positioned relative to the first-mentioned record, a frame, and said actuating means including a plurality of linear actuators connected to said frame and to the respective supporting means.

7. The subject matter of claim 6 and synchronizing means symmetrically connected to said supporting means such that any transfer forces therebetween are applied along said axis.

8. The subject matter of claim 7 wherein said synchronizing means include a plurality of bands, means movably mounting said bands relative to said frame, and means coupling both of said supporting means to said bands.

9. In a magnetic disc file, the combination of a set of spaced discs and means for rotating the discs, a set of transducers for said discs, a frame, a first and a second carriage mounted for movement relative to said frame, said transducers attached to said first carriage, structural means attached to said second carriage and combining with said second carriage to have inertial properties similar to the inertial properties of said first carriage and the transducers attached thereto, actuators attached to said carriages, and means between said actuators to require said carriages to move in opposite linear directions in a manner such that the movement of one carriage provides a dynamic reaction for the other and said frame experiences no substantial reactive load.

References Cited

UNITED STATES PATENTS

| | | | |
|---|---|---|---|
| 3,078,129 | 2/1963 | Beeck | 308—3.8 |
| 3,176,083 | 3/1965 | Hauser | 179—100.2 |
| 3,235,671 | 2/1966 | Rich | 179—100.2 |
| 2,994,856 | 8/1961 | Dickinson | 340—174.1 |

BERNARD KONICK, Primary Examiner

WILLIAM F. WHITE, Assistant Examiner

U.S. Cl. X.R.

179—100.2